(12) United States Patent
Choi et al.

(10) Patent No.: US 6,698,929 B2
(45) Date of Patent: Mar. 2, 2004

(54) TURBO COMPRESSOR

(75) Inventors: Moon Chang Choi, Gyeonggi-do (KR);
Kwang Ha Suh, Gyeonggi-do (KR);
Young Kwan Kim, Incheon-si (KR);
Yoo Chol Ji, Incheon-si (KR); Dae Sung Wang, Seoul (KR)

(73) Assignee: LG Electronics Inc., Seoul (KR)

( * ) Notice: Subject to any disclaimer, the term of this patent is extended or adjusted under 35 U.S.C. 154(b) by 155 days.

(21) Appl. No.: 10/006,659

(22) Filed: Dec. 10, 2001

(65) Prior Publication Data

US 2002/0097929 A1 Jul. 25, 2002

(30) Foreign Application Priority Data

Jan. 19, 2001 (KR) .......................................... 2001-3239

(51) Int. Cl.[7] .............................................. F16C 32/06
(52) U.S. Cl. ...................................... 384/103; 417/247
(58) Field of Search ................................. 384/103, 192, 384/199; 417/244, 247, 350, 357, 423.12, 423.14

(56) References Cited

U.S. PATENT DOCUMENTS 6,398,517 B1 * 6/2002 Choi .......................... 417/243
6,471,493 B2 * 10/2002 Choi et al. .................. 417/350
6,488,238 B1 * 12/2002 Battisti ....................... 244/204

* cited by examiner

*Primary Examiner*—Pam Rodriguez
(74) *Attorney, Agent, or Firm*—Birch, Stewart, Kolasch & Birch, LLP

(57) ABSTRACT

A turbo compressor is provided which includes a motor having a stator with a rotor which rotates in the inside of the stator. A rotation shaft is press-fitted into the rotor and is integrally rotated with the rotor. A bearing is provided for supporting the rotation shaft of the motor. At least one impeller is attached to the rotation shaft of the motor and rotated therewith. A foil bearing including a plurality of foils is provided. First ends of the foils are respectively fitted into a multitude of engaging grooves defined on a circumferential inner surface of the stator, and second ends of the foils make contact with a circumferential outer surface of the rotor.

1 Claim, 3 Drawing Sheets

TURBO COMPRESSOR

BACKGROUND OF THE INVENTION

1. Field of the Invention

The present invention relates to a compressor, and more particularly, a turbo compressor having a simple construction and a high operating efficiency.

2. Description of the Related Art

Generally, a compressor is used in such a way as to convert mechanical energy into compressive energy of a compressible fluid, and is employed in an air conditioner, or the like. The Compressors are classified into a reciprocating compressor, a scroll compressor, a turbo (centrifugal) compressor and a vane (rotary) compressor.

In a turbo compressor, fluid is drawn in an axial direction using rotational force of an impeller, and then the fluid is compressed while being discharged along a centrifugal direction.

Turbo compressors are classified into a single-stage turbo compressor and a two-stage turbo compressor, depending upon the number of impeller(s) and the number of compression chamber(s). Also, turbo compressors are classified into a back-to-back type turbo compressor and a face-to-face type turbo compressor, depending upon an arrangement of impellers.

Among the turbo compressors, a two-stage turbo compressor includes, as shown in FIG. 1, a motor housing 1, first and second bearing plates 2A and 2B which are respectively arranged at both ends of the motor housing 1, and a shroud plate 3 which is mounted to an outside surface of the first bearing plate 2A.

Here, the first diffuser casing 4A covers the outside surface of the shroud plate 3, and a bearing cover 5 is attached to the outside surface of the second bearing plate 2B.

The bearing cover 5 is covered by a volute casing 6, and the second diffuser casing 4B is attached to an outside surface of the volute casing 6.

A motor M is disposed in the motor housing 1. A suction pipe SP is connected to a side of the motor housing 1, and a discharge pipe DP is connected to a side of the volute casing 6.

The shroud plate 3 and the first diffuser casing 4A define a first compression chamber Sc1, and the volute casing 6 and the second diffuser casing 4B define a second compression chamber Sc2.

The motor M is composed of a stator MS, a rotor MR mounted inside the stator MS and a rotation shaft 7 which is press-fitted through the rotor MR.

Both ends of the rotation shaft 7 of the motor M respectively pass through the first and second bearing plates 2A and 2B, and are supported by the first and second radial foil bearings 9A and 9B which are respectively fitted into the first and second bearing plates 2A and 2B.

A first stage impeller 8A which is located inside the first compression chamber Sc1 and a second stage impeller 8B which is located inside the second compression chamber Sc2, are respectively attached to both ends of the rotation shaft 7 of the motor M. A thrust foil bearing 10 which serves to support an end of the rotation shaft 7, is attached to the outside surface of the second bearing plate 2B.

Hereinafter, an operating pattern of the conventional two-stage turbo compressor constructed as mentioned above will be described.

First, when the rotation shaft 7 is rotated by driving of the motor M, the first and second stage impellers 8A and 8B attached to both ends of the rotation shaft 7 also rotate. Thereby, the fluid, which is drawn through the suction pipe SP, flows into the first compression chamber Sc1 via the first gas passage 11 and the first suction space Ss1. In the first compression chamber Sc1, the first-stage compression process is conducted on the fluid by the first stage impeller 8A.

Thereafter, the provisionally compressed fluid, which has been compressed through the first-stage compression process, is drawn into the second compression chamber Sc2 via the second gas passage 12 and the second suction space Ss2 for the purpose of the second-stage compression process by the second stage impeller 8B. After the second-stage compression is performed, the fluid is discharged through the discharge pipe DP after being collected by the volute casing 6.

In the conventional two-stage turbo compressor, since the fluid is compressed through multi-step compression processes, compressibility of the fluid has been enhanced.

In the conventional two-stage turbo compressor, the above-described first and second radial foil bearings 9A and 9B that only cause minimal friction are employed in order to support the rotational shaft 7 of the motor M which rotates at a high speed.

As shown in FIG. 2, each of the first and second radial foil bearings 9A and 9B includes a plurality of foils 20 which are mounted at the inside each of the first and second bearing plates 2A and 2B, respectively.

Each foil 20 is formed of a curved rectangular thin plate as shown in FIG. 3. Each foil 20 is configured in a manner such that one end of the foil 20 is crooked to define an engaging portion 201. Due to the fact that engaging portions 201 of the plurality of foils 20 are respectively engaged into a plurality of grooves 2a which are defined on a circumferential inner surface of each of the first and second bearing plates 2A and 2B, the plurality of foils 20 cooperate one with another to define an iris-shaped contour.

One of the problems of the conventional turbo compressor is that, since the pressures applied to the rotation shaft 7 in a radial direction are supported at two places by both first and second radial foil bearings 9A and 9B, a driving efficiency of the motor M is deteriorated due to a wide frictional area between the first and second radial foil bearings 9A and 9B and the rotation shaft 7. Furthermore, since the construction of the turbo compressor becomes more complicated causing a windage loss, whereby an efficiency of the turbo compressor is lowered.

The driving efficiency lowering phenomenon caused by friction between the first and second radial foil bearings 9A and 9B and the rotation shaft 7, occurs due to a kind of a mechanical loss.

Also, because of components such as the first and second bearing plates 2A and 2B for respectively supporting the first and second radial foil bearings 9A and 9B are needed, a productivity is lowered in the conventional turbo compressor.

For reference, the power loss which occurs when the compressor is running, will be described below.

The power loss of the compressor is largely categorized into a mechanical loss, a motor loss, a leakage loss and an aerodynamic loss.

The mechanical loss is resulted by the friction between the rotor MR and the stator MS, the friction between the thrust foil bearing 10 and the rotation shaft 7, the friction generated on back surfaces of the first and second stage impellers 8A and 8B, and the above-described friction between the first and second radial foil bearings 9A and 9B and the rotation shaft 7. The mechanical loss forms about 44% of the total power loss.

The mechanical loss produced by the friction between the first and second radial foil bearings 9A and 9B and the rotation shaft 7 occupies about 7.3% of the total power loss, and the mechanical loss which produced by the friction between the rotor MR and the stator MS occupies about 25% of the total power loss.

SUMMARY OF THE INVENTION

Accordingly, the present invention has been made in an effort to solve the problems occurring in the related art, and an object of the present invention is to provide a turbo compressor in which a supporting structure for a rotation shaft is simplified, thereby improving the operating efficiency and the productivity of the turbo compressor.

In order to achieve the above object, the present invention provides a turbo compressor a motor comprising a stator with a rotor which rotates in the inside of the stator and a rotation shaft which is press-fitted into the rotor and integrally rotated with the rotor, a bearing means for supporting the rotation shaft of the motor, at least one impeller attached to the rotation shaft of the motor and rotated therewith, and a foil bearing including a plurality of foils, wherein first ends of the foils are respectively fitted into a multitude of engaging grooves defined on a circumferential inner surface of the stator, and second ends of the foils make contact with a circumferential outer surface of the rotor.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
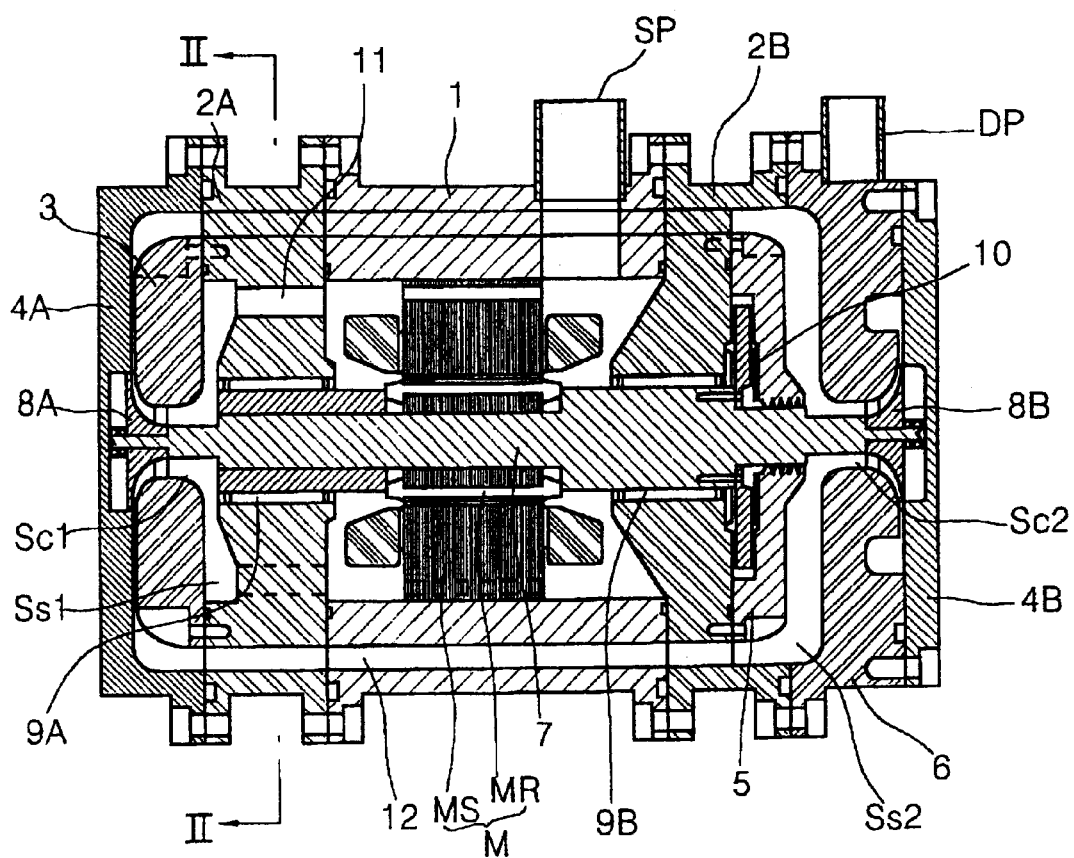
FIG. 1 is a cross-sectional view illustrating a construction of a conventional turbo compressor.
Figure 2:
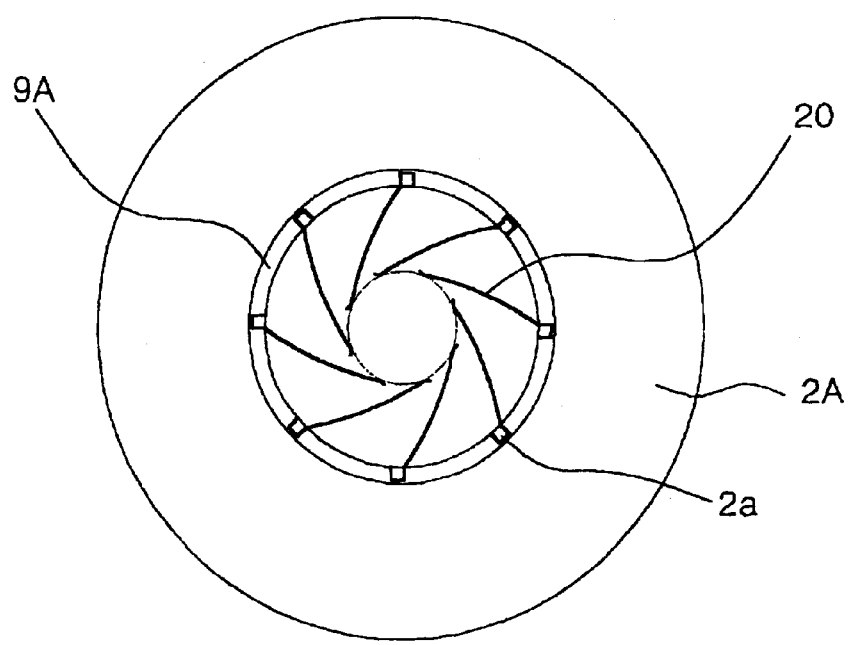
FIG. 2 is a cross-sectional view taken along the line II—II of FIG. 1, illustrating a foil bearing mounting structure in the conventional turbo compressor.
Figure 3:
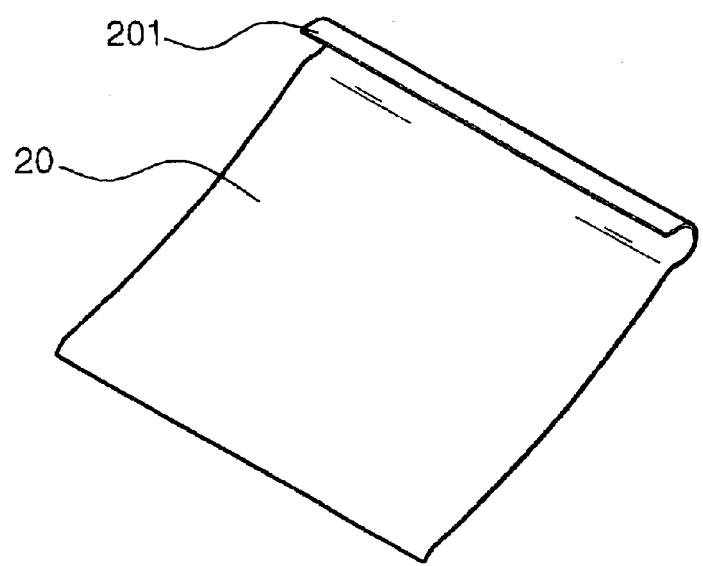
FIG. 3 is a perspective view illustrating an independent appearance of a single foil which is used in a foil bearing applied to the conventional turbo compressor.

Reference will now be made in greater detail to a preferred embodiment of the invention, an example of which is illustrated in the accompanying drawings. Wherever possible, the same reference numerals will be used throughout the drawings and the description to refer to the same or like parts.

First, a turbo compressor in accordance with the embodiment of the present invention includes a bearing means for supporting a rotation shaft of a motor.

Figure 4:
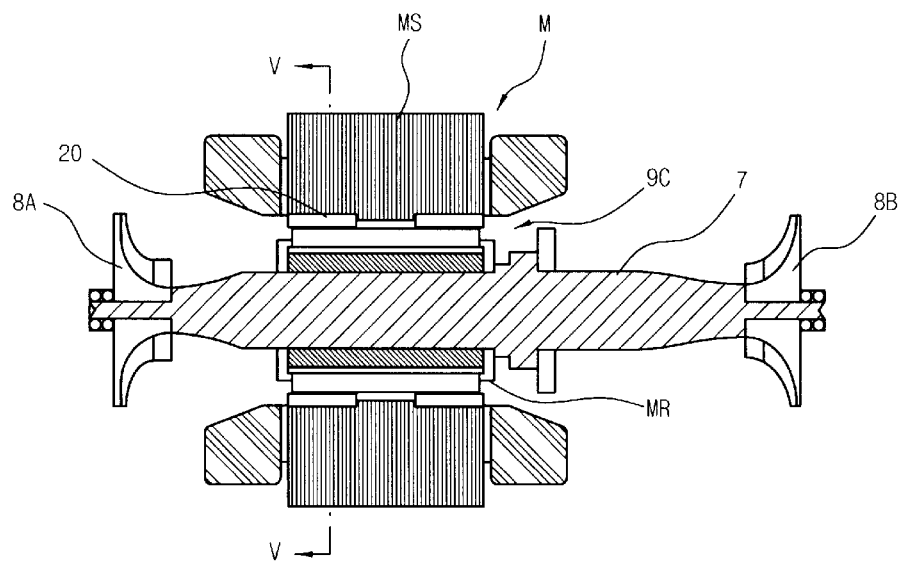
FIG. 4 is a longitudinal cross-sectional view illustrating a bearing structure of a turbo compressor in accordance with an embodiment of the present invention.
Figure 5:
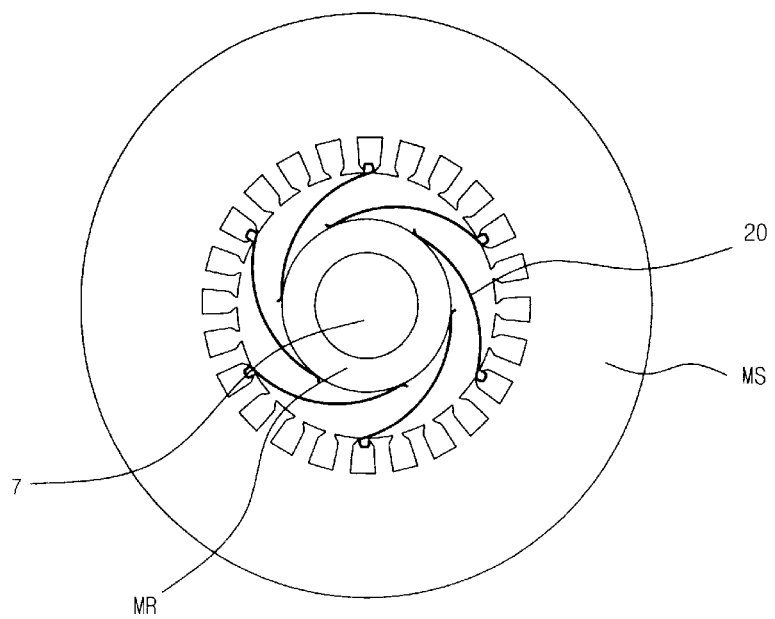
FIG. 5 is a transverse cross-sectional view taken along the line V—V of FIG. 4, illustrating the bearing structure of the turbo compressor in accordance with the embodiment of the present invention.

Referring to FIGS. 4 and 5, the bearing means comprises a foil bearing 9C. The foil bearing 9C has a plurality of foils 20. The plurality of foils 20 are respectively fitted, at first ends thereof, into a multitude of engaging grooves which are defined on a circumferential inner surface of a stator MS, in a manner such that the plurality of foils 20 are brought, at the second ends thereof, into contact with a circumferential outer surface of a rotor MR.

In this embodiment of the present invention, since the rotation shaft 7 is supported by the foil bearing 9C in a motor M, parts such as the bearing plates 2A and 2B (see FIG. 1) are not needed. As a result, the construction of the entire turbo compressor in accordance with the present invention is simpler. And, the windage loss can be reduced since the amount of parts are reduced.

Moreover, due to the fact that the friction between the radial foil bearings 9A and 9B and the rotation shaft 7 which friction formed a large percentage of the whole power loss in the conventional turbo compressor is prevented, and the friction between the rotor MR and the stator MS is reduced due to the presence of the foil bearing 9C mounted to the stator MS, the power loss caused by the mechanical friction can be lowered.

As a result, the turbo compressor according to the present invention, as mentioned above, provides advantages in that, since a supporting structure for a rotation shaft is simplified, friction and a windage loss can be reduced. Further, due to the fact that assemblability of the entire turbo compressor is elevated, the operating efficiency and the productivity can be remarkably improved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A turbo compressor comprising:

a motor having a stator with a rotor which rotates in the inside of the stator and a rotation shaft which is press-fitted into the rotor and integrally rotated with the rotor;

a bearing means for supporting the rotation shaft of the motor;

at least one impeller attached to the rotation shaft of the motor and rotated therewith; and a foil bearing including a plurality of foils, wherein first ends of the foils are respectively fitted into a multitude of engaging grooves defined on a circumferential inner surface of the stator, and second ends of the foils make contact with a circumferential outer surface of the rotor.

* * * * *